Figure 2:
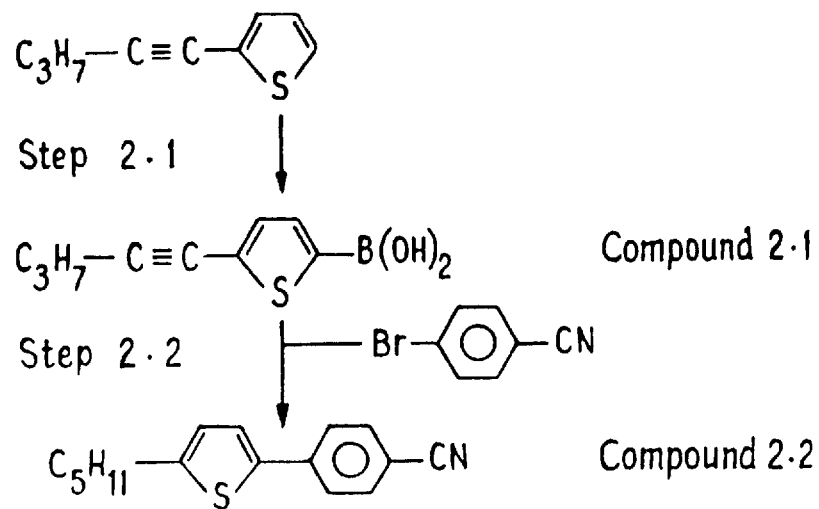

US005888421A

United States Patent [19]
Toyne et al.

[11] Patent Number: 5,888,421
[45] Date of Patent: Mar. 30, 1999

[54] ANISOTROPIC ORGANIC COMPOUNDS

[75] Inventors: Kenneth Johnson Toyne; John William Goodby; Alexander Seed, all of Humerside; George William Gray, Dorset; Damien Gerad McDonnel, Worcestershire; Edward Peter Raynes, Worcestershire; Sally Elizabeth Day, Worcestershire; Kenneth John Harrison, Worcestershire; Michael Hird, Humberside, all of England

[73] Assignee: The Secretary of State for Defence in her Britannic Majesty's Government of the United Kingdom of Great Britain and Northern Ireland, United Kingdom

[21] Appl. No.: 308,207

[22] Filed: Sep. 19, 1994

Related U.S. Application Data

[63] Continuation of Ser. No. 2,768, Jan. 13, 1993, abandoned.

[30] Foreign Application Priority Data

Mar. 13, 1991 [GB] United Kingdom .................. 9105362

[51] Int. Cl.$^6$ .......................... C09K 19/34; C07D 333/36
[52] U.S. Cl. .......................... 252/299.61; 549/68; 549/83; 252/299.67
[58] Field of Search .......................... 252/299.01, 299.61, 252/299.67; 549/63, 68, 83

[56] References Cited

U.S. PATENT DOCUMENTS

| | | | |
|---|---|---|---|
| 4,970,022 | 11/1990 | Scheuble et al. .................. | 252/299.61 |
| 5,496,500 | 3/1996 | Toyne et al. .................. | 252/299.61 |
| 5,578,242 | 11/1996 | Goodby et al. .................. | 252/299.01 |

FOREIGN PATENT DOCUMENTS

| | | |
|---|---|---|
| 3029378 | 2/1991 | Germany . |
| 2 2229 179 | 9/1990 | United Kingdom . |

OTHER PUBLICATIONS

Chemical Abdstracts, vol. 111, No. 2, 10 Jul. 1989, (Columbus, Ohio US) H. Satonaka: "Synthesis and mesomorphic properties of 2-thiophenecarboxylic acid esters and 2-thienylacrylic acid esters", see p. 583, abstract 15651x, & Senryo to Yakuhin, 1988, 33(8), 223-38.

Molecular Crystals and Liquid Crystals, vol. 123 Nos./ 1/4, 1985, Gordon and Breach, Science Publishers Inc. and OPA Ltd (US) D.C. McDonnell et al.

(List continued on next page.)

Primary Examiner—Shean C. Wu
Attorney, Agent, or Firm—Nixon & Vanderhye

[57] ABSTRACT

$$R_1-A+B-D\}_k+E-G\}_m-R_2 \quad (I)$$

$$R_3-J-(X)_k-Y-R_4 \quad (II)$$

The invention describes liquid crystalline compounds or formula (I), where A, D and G are independently selected from phenyl, thiophene, hydrogenated phenyl, chlorinated phenyl and fluorinated phenyl, B and E are independently selected from a single bond C=≠C. C≡C.C00, azoxy and diazo, k and m are independently selected from 1 and 0, such that m+n is 1 or 2, and $R_1$ and $R_2$ are independently selected from R, R0, alkynyl, thioalkyl, hydrogen, CN, NCS and SCN; provided that at least one of $R_1$ and $R_2$ is selected from CN, NCS and SCN and that at least one of A, D and G is phenyl; and excluding where at least one of $R_1$ and $R_2$ is independently selected as CN and one of A, D or G is not thiophene, and where m is 0, A, and D are phenyl, B is a single bond and only one of $R_1$ or $R_2$ is NCS. Also described are compounds suitable for inclusion in a device utilizing pretransitional characteristics of liquid crystalline materials in the isotropic phase, of general formula (II) where J and Y are independently selected from phenyl, thiophene, hydrogenated phenyl, chlorinated phenyl and fluorinated phenyl, X is selected from C=≠C. C≡C.COO azoxy and diazo, k is 1 or 0 and $R_3$ and $R_4$ are independently selected from R, RO, alkynyl, thioalkyl, hydrogen, CN, NCS and SCN; provided that at least one of $R_3$ and $R_4$ is selected from CN, NCS and SCN and that at least one of J and Y is phenyl.

9 Claims, 8 Drawing Sheets

OTHER PUBLICATIONS

"The physical properties of fluorine derivatives of of 4–cyanobiphenyls", pp. 169–177, see the whole article.
CA 94: 46921 1981.
CA 98: 178983 1983.
CA 94: 217673, 1981.
Destrada et al. "On New Mesmorphic Sequences in some polar 2 or 3 chlorodibenzoates" in Mol. Cyst. Lig Cyst. vol. 116 pp. 47–56, 1984.
CA:95 :219871. 1981.
CA 87: 91677. 1977.
CA 86:170720. 1977.
CA 83: 191287. 1975.
"Flüsige Kristalle in Tabellen II" p. 57, 1984.
Tinh, "Reentrant Behavior and Cyano Substituted Aryl p–Alkoxycinnametes", Mol. Cryst. Liq. Cryst. 1983, vol. 91, pp. 285–294.

FIG. 1
Compound 1·1 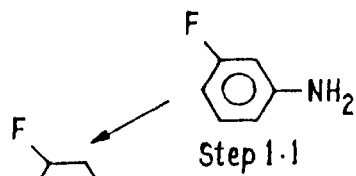
Step 1·2
Compound 1·2 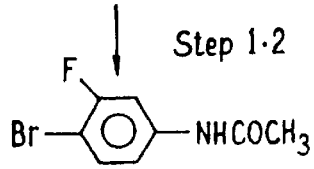
Step 1·3
Compound 1·3 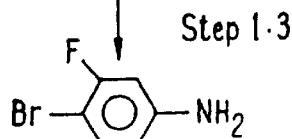
Step 1·4
Compound 1·4 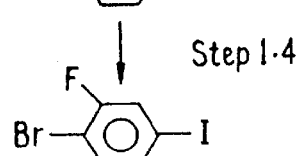
Step 1·5
Compound 1·5 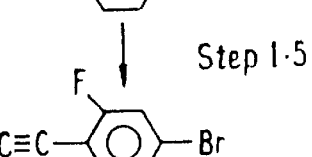
Step 1·6
Compound 1·6 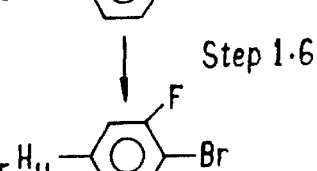
Step 1·7
Compound 1·7 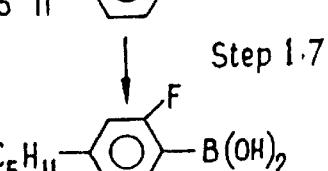
Step 1·8
Compound 1·8 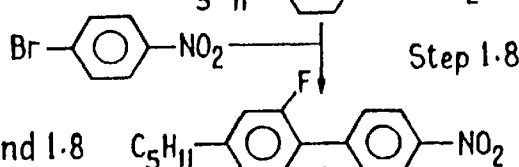
Step 1·9
Compound 1·9 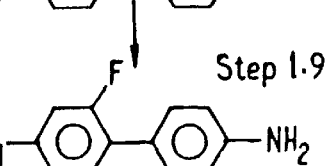
Step 1·10
Compound 1·10 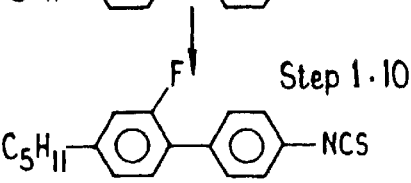

ANISOTROPIC ORGANIC COMPOUNDS

This is a of application Ser. No. 08/002,768 filed Jan. 13, 1993, now abandoned, which is a continuation of PCT/GB92/00412, filed Mar. 9, 1992.

This invention relates to compounds containing a cyano, isothiocyanato or thiocyanate group and which have liquid crystalline properties and/or are suitable for use as constituents of liquid crystal materials. The invention also relates to use of such compounds in liquid crystal materials.

Liquid crystal materials and devices exploit the electro-optical properties of nematic and cholesteric (N or N*), or smectic (S) with particularly useful smectic phases being chiral smectic C ($S_C^*$) or smectic A.

Liquid crystal materials which show ferroelectric $S_C^*$ phase are useful in fast switching displays such as television or VDU screens as the $S_C^*$ phase can be swithched in a few milliseconds or even microseconds. The principle of $S_C^*$ switching is described inter alia by N A Clark and S T Lagerwall in App Phys Lett 36 (1980) p899.

Materials which show an $S_A$ liquid crystal phase may be used in display devices which exploit the electroclinic effect.

The use of liquid crystal materials to exhibit electro-optical effects in displays and other optical devices such as digital calculators, watches, meters and alphanumeric laptop computers is now well known. However, known liquid crystal materials are not ideal in all respects and a considerable amount of work is currently being carried out in the art to improve their properties.

Liquid crystal materials normally consist of specially selected mixture compositions and improved materials are often obtained by forming new mixtures having an improved combination of properties.

The composition of a liquid crystal mixture is generally selected so that the mixture shows desirable properties. In particular such properties include:

(1) a liquid crystalline temperature range—including room temperature (20° C.)—which is as wide as possible;

(2) a melting point (solid-to-liquid crystal transition temperature) which is as low as possible;

(3) a clearing point (liquid crystalline to isotropic liquid transition temperature) which is as high as possible;

(4) a positive or negative (as appropriate) dielectric anisotropy (permittivity measured parallel to the molecular axis less that measured perpendicular to the molecular axis) which is as great as possible in order to minimise the display voltage;

(5) a viscosity which is as low as possible in order to minimise the display switching speeds;

(6) an electro-optical response which varies as little as possible with temperatures;

(7) a good chemical and photochemical stability;

Examples of further particular properties useful in specific applications include:

(8) a good multiplexability;

(9) an ability to switch dielectric anisotropy with frequency;

(10) a birefringence of selected magnitude;

(11) specific elastic constants which can be tailored to meet specific device requirements; and

(12) high electrical resistivity for certain applications.

Liquid crystal materials are generally mixtures of compounds which individually or together show a liquid crystal phase. A number of desirable characteristics are sought in such compounds and materials. Among these are chemical stability, persistence of appropriate liquid crystal phases over a wide temperature range preferably including root temperature, and for some devices a high birefringence (Δn) is sought.

A class of compounds which is widely used as nematic materials are the alkyl and alkoxy cyanobiphenyls and terphenyls:

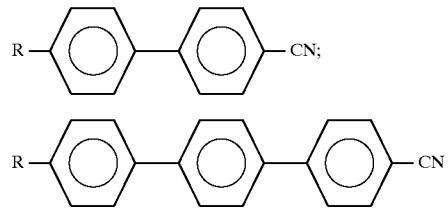

where R is alkyl or alkoxy. These are useful liquid crystalline compounds, but for some applications compounds with higher birefringence is desirable.

It is an object of this invention to provide compounds and materials having at least some of these desirable characteristics, and in particular a high birefringence.

According to this invention, liquid crystalline compounds of formula I are provided:

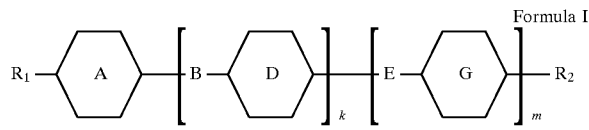

Formula I where A, D and G are independently selected from phenyl, thiophene, hydrogenated phenyl, chlorinated phenyl and fluorinated phenyl, B and E are independently selected from a single bond C≡C, C=C, COO, azoxy and diazo, k and m are independently selected from 1 and 0, such that m+n is 1 or 2, and $R_1$ and $R_2$ are independently selected from R, RO, alkynyl, thioalkyl, hydrogen, CN, NCS and SCN;

provided that that at least one one of $R_1$ and $R_2$ is selected from CN, NCS and SCN and that at least one of A, D and a is phenyl;

and excluding where at least one of $R_1$ and $R_2$ is independently selected as CN and one of A, D or G is not thiophene, and where m is O, A and D are phenyl, B is a single bond and only one of $R_1$ or $R_2$ is NCS.

The structural and other preferences are expressed below on the basis of inter alia desirable liquid crystalline characteristics, in particular high birefringence for use in liquid crystal materials.

Where one of $R_1$ and $R_2$ are selected from R, RO, alkynyl and thioalkyl, then $R_1$ and $R_2$ are preferably $C_{1-15}$ and more preferably $C_{1-5}$.

According to a further aspect of this invention compounds suitable for inclusion in devices utilising pretransitional characterisitcs of liquid crystalline materials in the isotropic phase are provided, of general Formula II

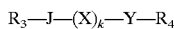

Formula II where J and Y are independently selected from phenyl, thiophene, hydrogenated phenyl, chlorinated phenyl and fluorinated phenyl, X is selected from C≡C, C=C, COO, azoxy and diazo, k is 1 or 0 and $R_3$ and $R_4$ are independently selected from R, RO, alkynyl, thioalkyl, hydrogen, CN, NCS and SCN.

Typically such characterisitics can be utilised in devices such as Optical Kerr Effect devices. Such devices are often used as optical shutters or optical modulators, and rely on the the fact that birefringence (Δn) of a medium is proportional to the square of an applied electric field. Such an effect is often termed the quadratic electro-optic effect and can be investigated using degenerate four wave mixing (P Madden et al IEEE J of Quantum Electronics QE22 No 8 Aug. 1986 p1287).

Overall preferred structures for Formula I are given below:

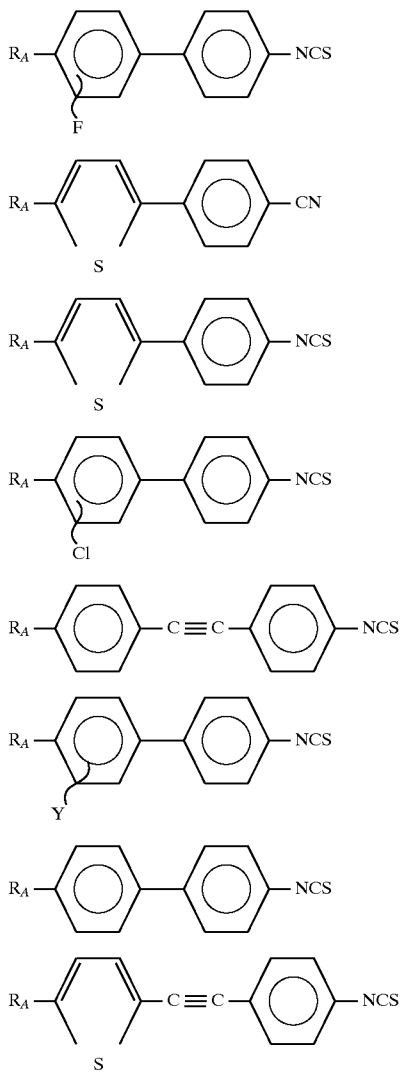

where $R_A$ is selected from alkyl, alkoxy, alkynyl and thioalkyl, and Y is selected from hydrogen and fluorine.

Overall preferred structures for formula II are those listed below:

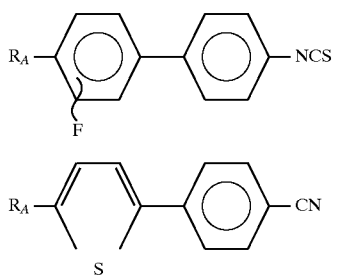

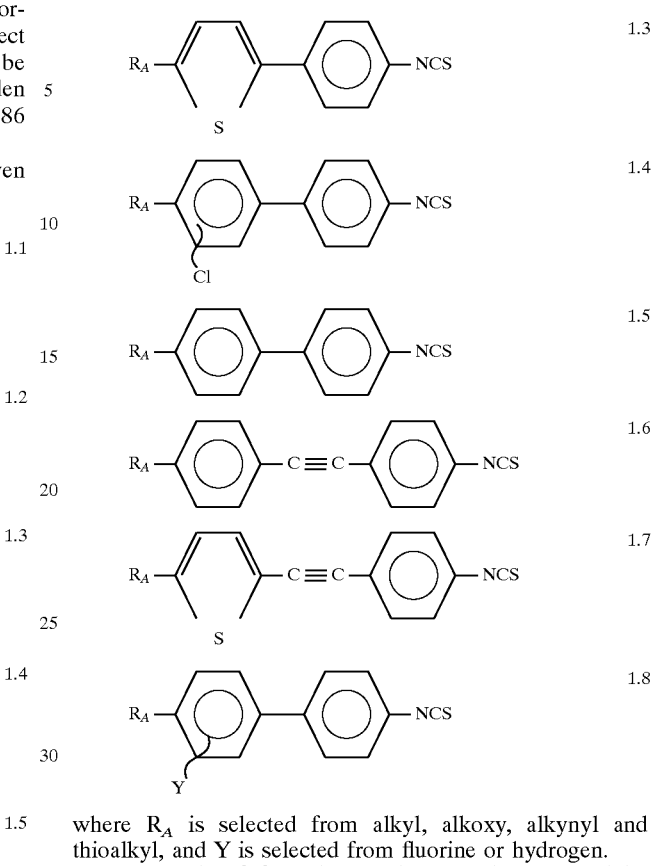

where $R_A$ is selected from alkyl, alkoxy, alkynyl and thioalkyl, and Y is selected from fluorine or hydrogen.

Compounds of formula I and II can be prepared by various routes which will be apparent to those in the art. A preferred route for compounds of formulae I and II where $R_1$ is NCS comprises coupling of the appropriate boronic acid with 1-Bromo-nitrobenzene mediated by a palladium catalyst (eg tetrakis (triphenylphosphine)palladium(O)) to achieve the appropriate nitrophenyl. Conversion of the nitrophenyl to isothiocyanatophenyl is possible via hydrogenation to a phenyl amine with subsequent treatment with thiophosgene. Suitable conditions for such couplings are well known. Typical preparation routes for compounds of formula I and formula II where $R_1$ is CN include coupling of the appropriate boronic acid with 4-Bromonitrobenzile, typically mediated by a palladium catalyst. Inclusion of linking groups X are well known to those skilled in the art as are the methods of the preparation of the appropriate boronic acids to include the required end group substituent.

To prepare corresponding compounds in which the phenyl ring(s) is(are) substitued with fluorine, chlorine or hydrogen then the corresponding substituted starting compounds are used. The coupling reactions above are generally not affected by these substituents.

A further aspect of this invention is a liquid crystalline material, containing at least two components, at least one of which is a compound of formula I. Compounds of formula I, in particular the preferred compounds referred to above, have a number of desirable properties which which make them very useful components of liquid crystal materials, and even more particularly their high birefringence.

Suitable compounds for the other components of the liquid crystal materials will be apparent to those skilled in the field, and will depend upon the properties such as dielectric anisotropy, birefringence, working temperature range etc required in the material for the application for which the material is intended. Some types of suitable material are discussed briefly below.

Preferably as well as containing one or more formula I compounds a mixture of the invention contains one or more compounds of formula III

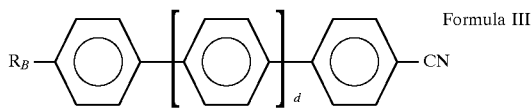

Formula III wherein $R_B$ is alkyl, thioalkyl or alkoxy, preferably containing 1–8 carbon atoms, and preferably straight chain, and wherein d is 1 or 0. Such materials are included in the subject matter of GB 1433130 and GB patent Application Number 90/19268.5. The liquid crystal material may for example contain other liquid crystalline compounds which have a positive dielectric anisotropy, for example as described in EP-A-01322377.

A mixture of the invention may also contain such materials as phenyl thiazolenes of typical structure such as that seen in Formula IV

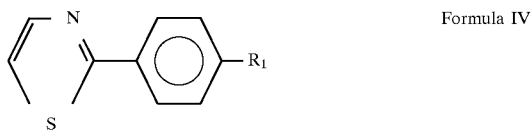

Formula IV where typically $R_1$ is CN, alkyl, alkoxy etc.

The material may alternatively or also contain liquid crystalline compounds of low dielectric anisotropy, or a cholesteric mixture which may be thermochromic. Some examples of such compounds are described in EP-A-0132377.

The material may alternatively or also contain liquid crystalline compounds having a high clearing point, for example in order to raise the nematic phase to isotropic phase (N-I) transition temperature. Some examples of such compounds are described in EP-A-0132377.

To cause the material of this aspect of the invention to show a cholesteric or chiral nematic phase the material must contain at least one compound containing an asymmetric carbon atom. This may be a chiral compound of formula I, eg S(+) 4-(2-methylbutyl)-4'-cyano biphenyl or S(+) 4-(2-methylbutoxy)-4'-cyano biphenyl.

The material may also contain one or more pleochroic dyes, for example the dyes described in EP-A-82300891.7.

The proportions of these components used in the material of this aspect of the invention will depend upon the intended application, and the material may usefully contain two or more compounds of formula I. If the material does contain two or more compounds of formula I then they may be in proportions that are approximate to a eutectic mixture.

The materials of this aspect of the invention may be used in many of the known forms of liquid crystal display devices, for example a twisted nematic device, Freedericks effect device, cholesteric memory mode device, cholesteric to nematic phase change effect device, dynamic scattering effect device, or a supertwist effect device. The method of construction and operation of such devices, and characteristics of a liquid crystal material suitable for use therein, are well known in the field. Typically an electro-optical display device will consist of 2 substrates between which a layer of the liquid crystal material may be sandwiched. At least one of the substrates is optically transparent and both have addressable electrodes which are preferably made of a transparent material on their opposing faces. By applying an electric field across the layer of liquid crystal material via the electrodes an electro-optical effect is achieved which may be viewed directly or preferably through one or more polarising filters.

Another aspect of the invention is a material, being a mixture of compounds, characterised in that the mixture is suitable for inclusion in devices utilising pretransitional characterisitcs of liquid crystalline mixtures in the isotropic phase and that the mixture includes at least one compound of formula II. Such materials may incorporate compound(s) of formula III and/or formula IV.

Compounds of formula II and also materials including compound(s) of formula II may be used in devices that utilise the optical Kerr Effect. Typically optical Kerr effect devices comprise a glass cell containing two electrodes, where the glass cell is filled with a polar liquid. The device is frequently termed a Kerr cell. The Kerr cell can be positioned between two crossed polarisers having transmission axes at ±45° to an electric field applied across the Kerr cell. With zero voltage applied across the Kerr cell no light will be transmitted and the cell operates as a closed shutter. Application of a modulating voltage generates a field causing the Kerr cell to function as a variable wave plate and thus operating the Kerr cell as a shutter capable of opening proportionately to the applied field.

Nematic materials of this invention may be particularly suitable for use in ECB effect devices, due to the high birefringence of the materials. They may also be particularly suitable for use in polymer dispersed liquid crystal (PDLC) materials in which small droplets of a liquid crystal material are dispersed within a matrix of a transparent polymer.

Figure 9:
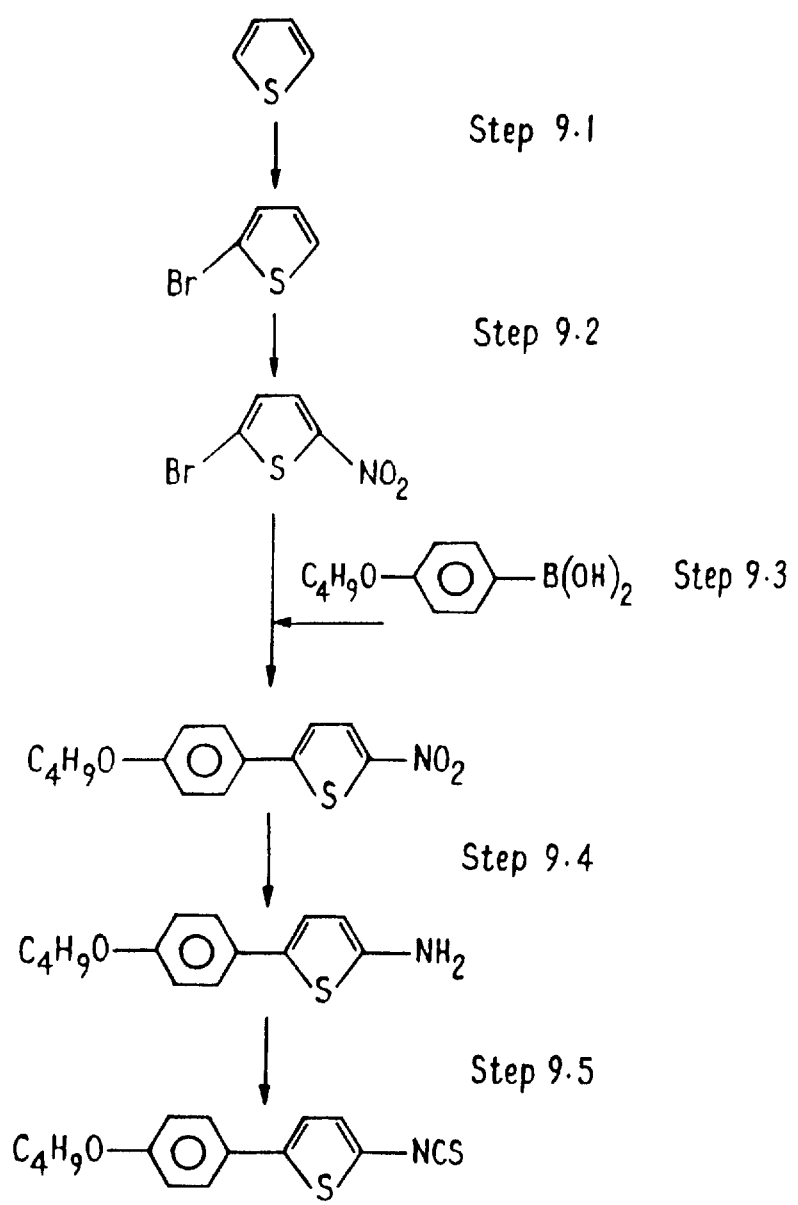
Figure 10:
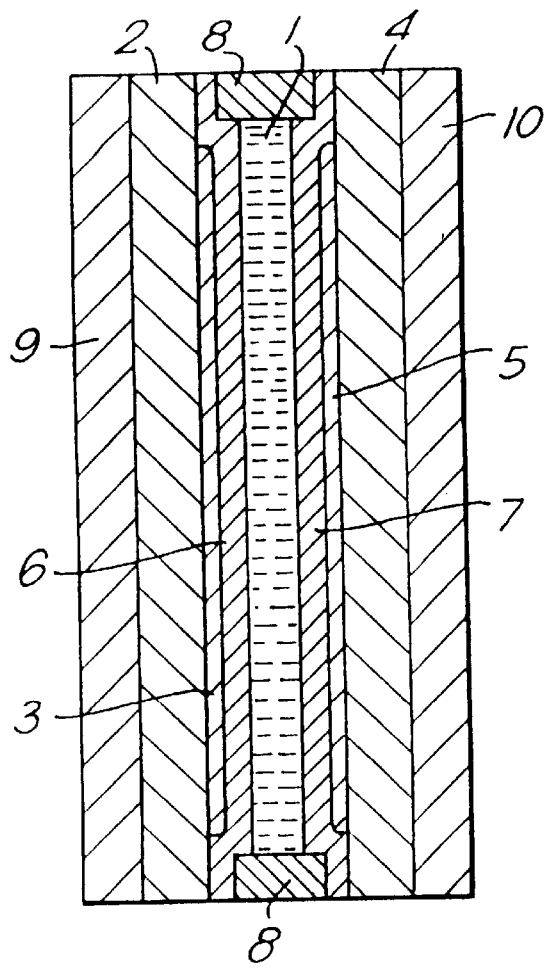
Figure 11:
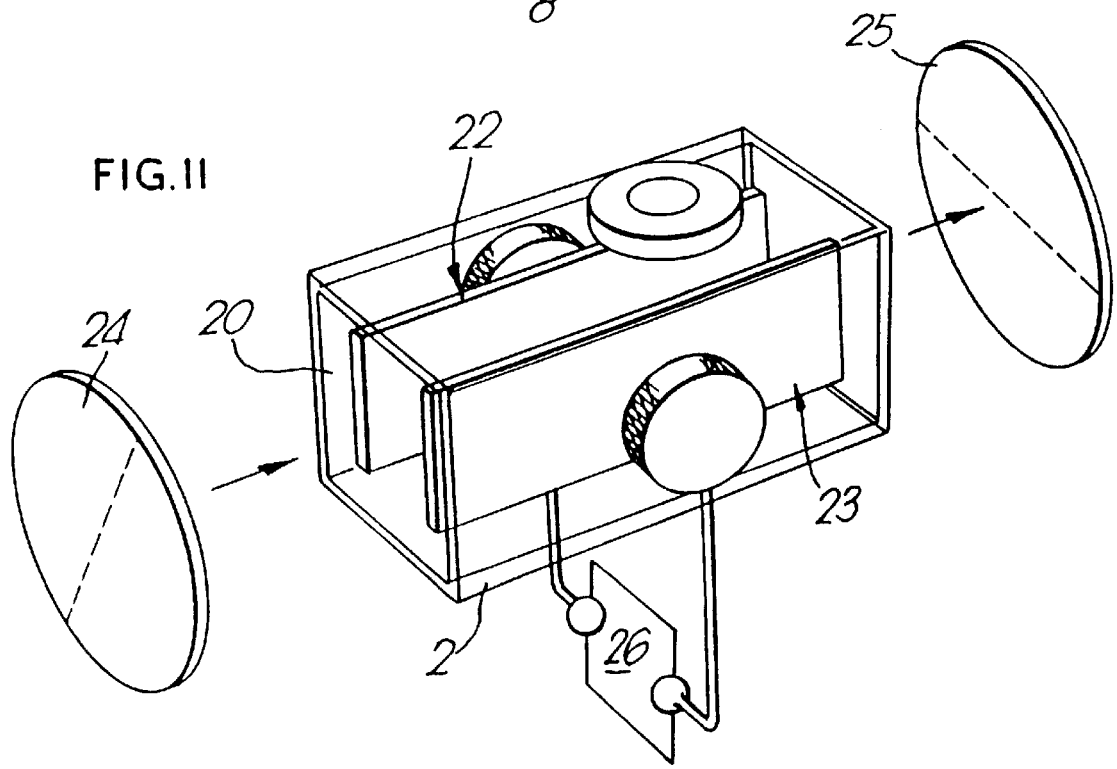

Non-limiting examples illustrating this invention will now be given, with reference to FIGS. 1–9 giving typical synthesis routes for example compounds of formula I and formula II, and FIGS. 10 and 11 are given by way of example only and schematically represent a liquid crystal device of the invention and a Kerr cell of the invention respectively.

EXAMPLE 1

Preparation of:

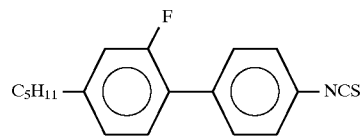

With reference to FIG. 1 it can be seen that example 1 can be prepared using the following synthetic route.

Step 1.1 3-Fluoroacetanilide.

A solution of acetic anhydride (30.30 g, 0.297 mol) in glacial acetic acid (30 ml) is added to stirred 3-fluoroaniline (30.0 g, 0.27 mol). The resulting stirred mixture is heated under reflux for 20 minutes and poured into cold water (500 ml). the product is extracted into ether (×2) and the combined ethereal extracts are washed with water and dried (MgSO$_4$). The solvent is removed in vacuo and the residue is recrystallized from aqueous acetic acid to yield colourless crystals with a yield of 28.90 g (70%).

Step 1.2 4-Bromo-3-fluoroacetanilide

N-Bromosuccinimide (15.73 g, 0.088 mol) is added all at once to a stirred solution of compound 1.1 (13.50 g, 0.088 mol) in dry dichloromethane at room temperature. The stirred mixture is heated under reflux for 5 hours (glc analysis showing a complete reaction and the presence of only one product peak) cooled and washed with lots of water. The aqueous extract is washed with dichloromethane and the combined organic extracts are washed with water and dried (MgSO$_4$). The solvent is removed in vacuo to give a pale orange solid, and a further sample can then recrystallised from hexane/dimethoxyethane (99:1) to yield colourless crystals, giving a yield of 20.40 g (100%).

Step 1.3 4-Bromo-3-fluoroaniline

36% hydrochloric acid (25 ml) is added dropwise to a stirred, refluxing solution of compound 1.2 (19.75 g, 0.085 mol) in ethanol (50 ml). The solution is heated under reflux for 2 hours (glc analysis revealing a complete reaction), cooled and water then added. The mixture is distilled to remove ethanol and ethylacetate, with the residue added to 5% sodium hydroxide and the product extracted into dichloromethane (×2). The combined organic extracts are washed with water and dried (MgSO$_4$). The solvent is removed in vacuo to give a fawn solid with a yield of 15.95 g (99%).

Step 1.4 1-Bromo-2-fluoro-4-iodobenzene

A stirred mixture of compound 1.3 (13.68 g, 0.072 mol) and 36% hydrochloric acid (110 ml) is gently warmed to obtain a solution, then cooled to −5° C. and a solution of sodium nitrite (5.47 g, 0.079 mol) in water is added dropwise whilst maintaining the temperature at −5° C. The mixture is stirred at 0° C. for 30 minutes, with cyclohexane (100 ml) then added followed by addition of a solution of potassium iodide (43.5 g, 0.26 mol) in water dropwise at a temperature of between 0° and 5° C. The mixture is stirred at room temperature for a few hours and the product then extracted into ether (×2). The combined organic extracts are washed with sodium metabisulphite, 10% sodium hydroxide, water and dried (MgSO$_4$). The solvent is removed in vacuo to give an off-white solid with a yield of 35.0 g (87%).

Step 1.5 1-Bromo-2-fluoro-4-pent-1-ynylbenzene

Quantities: pent-1-yne (4.02 g, 0.059 mol), n-butyllithium (6.00 ml, 10.0M in hexane, 0.060 mol), zinc chloride (8.16 g, 0.060 mol), compound 1.4 (15.5 g, 0.051 mol), tetrakis (triphenylphosphine)palladium(O) (2.95 g, 2.55 mol).

This experimental procedure is a zinc coupling reaction. The n-butyllithium solution is added dropwise to a stirred, cooled (−5° C. to 0° C.) solution of the pent-1-yne in dry THF under dry nitrogen. This mixture is stirred for 10 minutes and then a solution of the zinc chloride (dry) in dry THF is added dropwise at about −5° C. to 0° C. The mixture is stirred at room temperature for 15 minutes and a solution of compound 1.2 in dry THF is added dropwise at −5° C. to 0° C. followed by addition of the tetrakis (triphenylphosphine)palladium(O). The mixture is heated under reflux for 22 hours (glc analysis revealing a complete reaction). The crude product is distilled to yield 11.31 g (92%) colourless liquid.

Step 1.6 1-Bromo-2-fluoro-4-pentylbenzene

A stirred mixture of compound 1.5 (10.95 g, 0.045 mol) and platinum (IV) oxide (0.25 g) in ethanol (150 ml) is hydrogenated at room temperature and atmospheric pressure for 8 hours (glc analysis showing a complete reaction). The catalyst is filtered off and the solvent is removed in vacuo to yield a pale-orange solid with a yield of 10.58 g (98%).

Step 1.7 2-Fluoro-4-pentylphenylboronic acid

Quantities: compound 1.6 (9.92 g, 0.040 mol), n-butyllithium (4.00 ml, 10.0M in hexane, 0.040 mol), trimethyl borate (8.35 g, 0.080 mol).

This experimental procedure is a standard boronic acid preparation and yields a brown solid. The yield is 8.28 g (99%).

Step 1.8 2-Fluoro-4'-nitro-4-pentylbiphenyl

Quantities: 1-Bromo-4-nitrobenzene (2.15 g, 0.0106 mol), compound 1.7 (2.68 g, 0.0128 mol), tetrakis (triphenylphosphine)palladium(O) (0.38 g, 0.33 mol).

This experimental procedure nitration where the crude product is purified by column chromatography [silica gel/petroleum fraction (bp 40°–60° C.)—dichloromethane, 3:1] to give a pale yellow gel with yield of 2.95 g (97%).

Step 1.9 4'-Amino-2-fluoro-4-pentylbiphenyl

A stirred mixture of compound 1.8 (2.80 g, 9.76 mol) and 5% palladium on charcoal (1.50 g) in ethanol (100 ml) is hydrogenated at room temperature and atmospheric pressure for 8 hours (when glc analysis revealed a complete reaction). The catalyst is filtered off and the solvent removed in vacuo to yield 15.35 g (95%) of pale orange solid.

Step 1.10 2-Fluoro-4'-isothiocyanato-4-pentylbiphenyl

A solution of compound 1.9 (2.11 g, 8.21 mol) in chloroform is added to a stirred, cooled (0° C.) mixture of water, calcium carbonate (1.28 g, 0.013 mol), chloroform and thiophosgene (1.17 g, 0.010 mol). The mixture is heated at 35° C. for 1.5 hours and then poured into water. The aqueous layer is washed with dichloromethane and the combined organic extracts are washed with 1% aqueous hydrochloric acid and dried (MgSO$_4$). The solvent is removed in vacuo and the crude product purified by column chromatography (silica gel/dichloromethane) to give an off-white solid which is then crystallised from ethanol-ethyl acetate (1:1) to yield 1.36 g (55%) colourless crystals.

EXAMPLE 2

Preparation of:

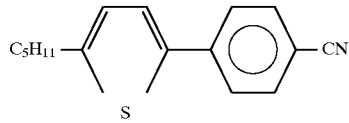

With reference to FIG. 2 it can be seen that example 2 can be prepared using the following synthetic route.

Step 2.1 2-Pent-1-ynylthiophene.

A solution of n-butyllithium (10.0 ml, 10.0M in hexane, 0.10 mol) is added dropwise to a stirred cooled (−5° to 0° C.) solution of pent-1-yne (6.80 g, 0.10 mol) in dry THF under dry nitrogen. This mixture is stirred for 10 minutes and then a solution of dry zinc chloride (13.63 g, 0.10 mol) in dry THF is added dropwise to 2-bromothiophene (16.00 g, 0.098 mol) at a temperature of between −5° C. and 0° C. followed by addition of tetrakis (triphenylphosphine)palladium(O) (3.40 g, 2.94 mol). The mixture is stirred at room temperature overnight (glc analysis revealing a complete reaction) and poured into 10% hydrochloric acid. The product is extracted into ether (×2) and the combined ethereal extracts are washed with aqueous sodium hydrogen carbonate and dried (MgSO$_4$). The solvent is removed in vacuo, then the product is filtered and distilled to yield 12.9 g (88%) colourless liquid.

Step 2.2 5-pent-1-ynylthiopen-2-ylboronic acid.

This experimental procedure is a standard boronic acid preparation using compound 2.1 (10.00 g, 0.067 mol), n-butyllithium (6.80 ml, 10.0M in hexane, 0.068 mol) and trimethyl borate (14.20 g, 0.137 mol). The yield is 12.00 g (93%) of brown solid.

Step 2.3 2-(4-cyanatophenyl)-5-pentylthiophene.

This is a standard coupling reaction where a compound 2.2 (1.85 g, 9.54 mol), 4-benzonitrile (1.45 g, 7.97 mol) and tetrakis (triphenylphosphine) palladium(O) (0.30 g, 0.26 mol) are used with 1,2-dimethoxymethane (35 ml) and 2M-sodium carbonate (35 ml) as solvents. The crude product is purified by column chromatography [silica gel/petroleum fraction (bp 40°–60° C.)—dichloromethane, 2:1]

and hydrogenated in ethanol (100 ml) in the presence of 5% palladium on charcoal catalyst at room temperature and atmospheric pressure. The catalyst is filtered off and the solvent removed in vacuo and the residue purified by [silica gel/petroleum fraction (bp 40°–60° C.)—dichloromethane, 2:1] to give a colourless oil which is subsequently distilled [Kugelrohr 150° C.(max) at 0.55 mmHg] to yield a colourless oil which crystallises on cooling. Yield is 1.45 g (71%).

EXAMPLE 3

Preparation of:

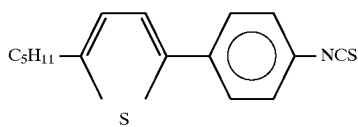

Figure 3:
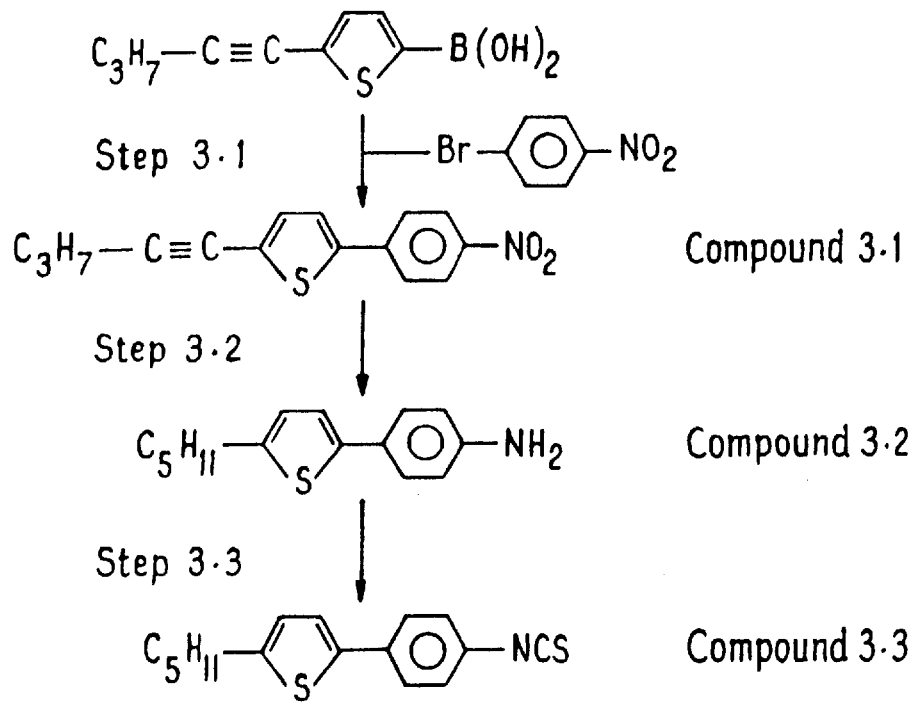

With reference to FIG. 3 it can be seen that example 3 can be prepared using the following synthetic route.

Step 3.1 2-(4-nitrophenyl-5-pent-1-ynylthiophene.

Quantities: 1-Bromo-4-nitrobenzene (2.35 g, 0.012 mol), compound 2.2 (2.75 g, 0.014 mol), tetrakis(triphenylphosphine)palladium(O) (0.42 g, 0.36 mol).

This experimental procedure is a standard nitration where the crude product is purified by column chromatography [silica gel/petroleum fraction (bp 40°–60° C.)—dichloromethane, 3:1] to give a pale yellow gel with yield of 2.64 g (81%).

Step 3.2 2-(4-Aminophenyl)-5-pentylthiophene

This procedure is a standard hydrogenation as exemplified by step 1.9 above, and uses compound 3.1 (2.42 g, 8.93 mol) and 5% palladium on charcoal (2.00 g). A pale yellow solid results with a yield of 2.13 g (97%).

Step 3.3 2-(4-isothiocyanatophenyl)-5-pentylthiophene.

A solution of compound 3.2 (1.98 g, 8.08 mol) in chloroform is added to a stirred, cooled (0° C.) mixture of water, calcium carbonate (1.26 g, 0.0126 mol), chloroform and thiophosgene (1.16 g, 0.010 mol). The mixture is heated at 40° C. for 2 hours and then poured into water. The product is extracted into dichloromethane and the combined organic extracts are washed with 10% aqueous hydrochloric acid and dried (MgSO$_4$). The solvent is removed in vacuo and the crude product purified by column chromatography (silica gel/dichloromethane) to give an off-white solid which is then crystallised from ethanol to yield 1.63 g (70%) colourless crystals.

EXAMPLE 4

Preparation of:

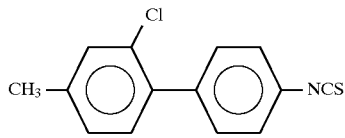

Figure 4:
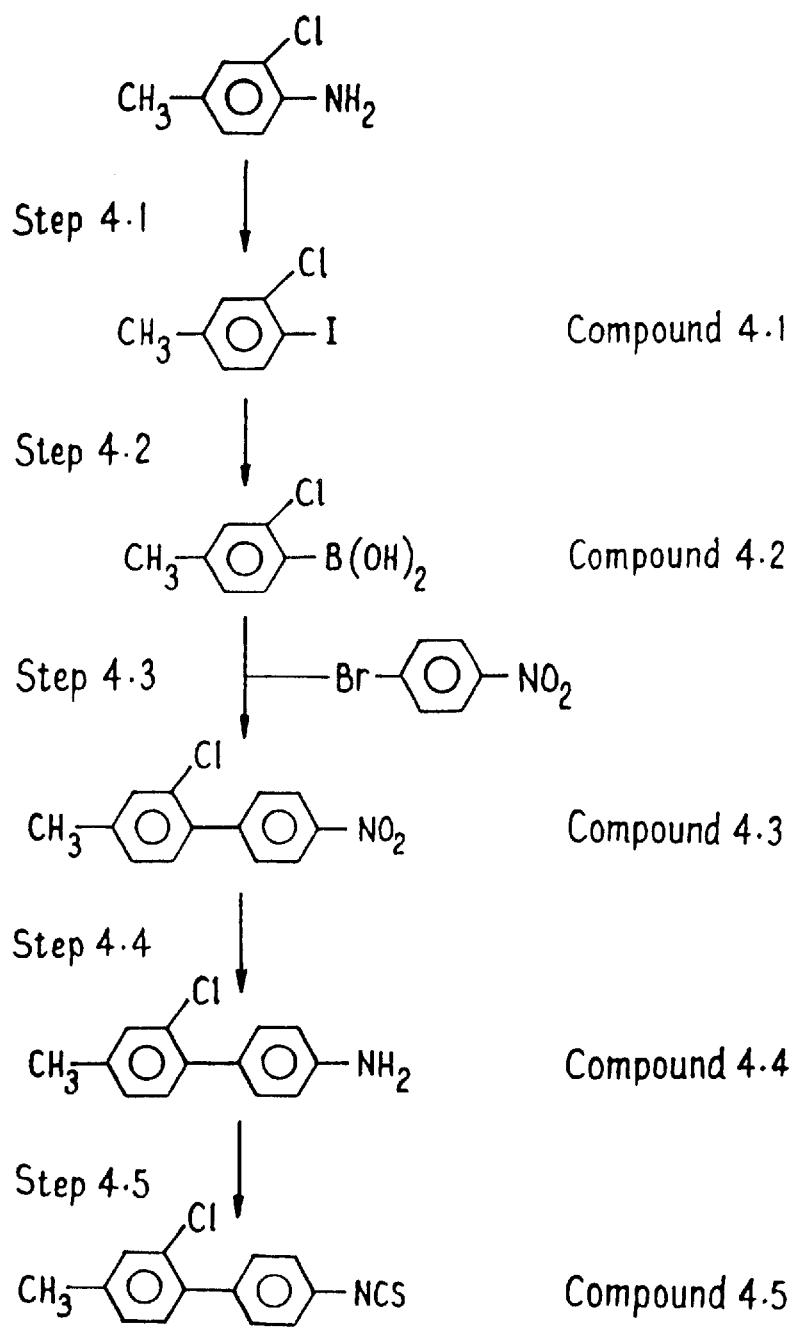

With reference to FIG. 4 it can be seen that example 4 can be prepared using the following synthetic route.

Step 4.1 3-chloro-4-iodotoluene.

A stirred mixture of 2-chloromethylaniline (25.00 g, 0.177 mol) and 36% hydrochloric acid is warmed gently to obtain a solution, then cooled to −5° C. and a solution of sodium nitrite (13.45 g, 0.195 mol) in water is added dropwise whilst maintaining the temperature at −5° C. The mixture is stirred at 0° C. for 30 minutes, 100 ml of cyclohexane is added and a solution of potassium iodide (58.77 g, 0.354 mol) in water is added dropwise at a temperature of between 0° and 5° C. The mixture is stirred at room temperature (overnight for convenience) and the product is extracted into ether (×2). The combined organic extracts are washed with sodium metabisulphite, 10% sodium hydroxide, water and dried (MgSO$_4$). The solvent is in vacuo to yield 35.0 g (87%) off-white solid.

Step 4.2 2-Chloro-4-methylphenylboromic acid.

This experimental procedure is a standard boronic acid preparation using compound 4.1 (18.50 g, 0.073 mol), n-butyllithium (7.50 ml, 10.0M in hexane, 0.075 mol) and trimethyl borate (15.20 g, 0.146 mol). The crude product is extracted into 10% potassium hydroxide solution and then washed with ether. The separated aqueous extract is acidified with 36% hydrochloric acid and the product extracted into ether (×2). The combined ethereal extracts are washed with water and dried (MgSO$_4$). The solvent is dried in vacuo to yield 4.86 g (39%) of colourless solid.

Step 4.3 2-Chloro-4-methyl-4'-nitrobiphenyl

Quantities: 1-Bromo-4-nitrobenzene (2.45 g, 0.012 mol), compound 4.2 (2.25 g, 0.013 mol), tetrakis(triphenylphosphine)palladium(O) (0.42 g, 0.36 mol).

This experimental procedure is a standard nitration where the crude product is purified by column chromatography [silica gel/petroleum fraction (bp 40°–60° C.)—dichloromethane, 5:1] to give a very pale yellow solid with yield of 2.95 g (99%).

Step 4.4 4'-Amino-2-chloro-4-methylbiphenyl.

This procedure is a standard hydrogenation using compound 4.3 (2.91 g, 0.012 mol), platinum(IV)oxide (0.15 g), ethyl acetate (60 ml) and ethanol (60 ml) and as exemplified by steps 1.9 and 3.2. The procedure yields 2.60 g (100%).

Step 4.5 2-Chloro-4'-isothiocyanato-4-biphenyl.

This is a standard procedure as described in step 3.3 and using compound 4.4 (2.41 g, 0.011 mol) with thiophosgene (1.59 g, 0.014 mol) and calcium carbonate (1.73 g, 0.017 mol). The crude product is purified by column chromatography (silica gel/dichloromethane) to give an off-white solid which is then crystallised from ethanol to yield 2.10 g (74%) colourless crystals.

EXAMPLE 5

Preparation of:

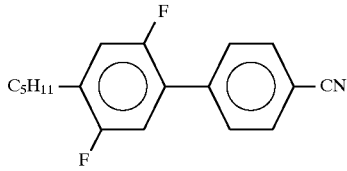

Figure 5:
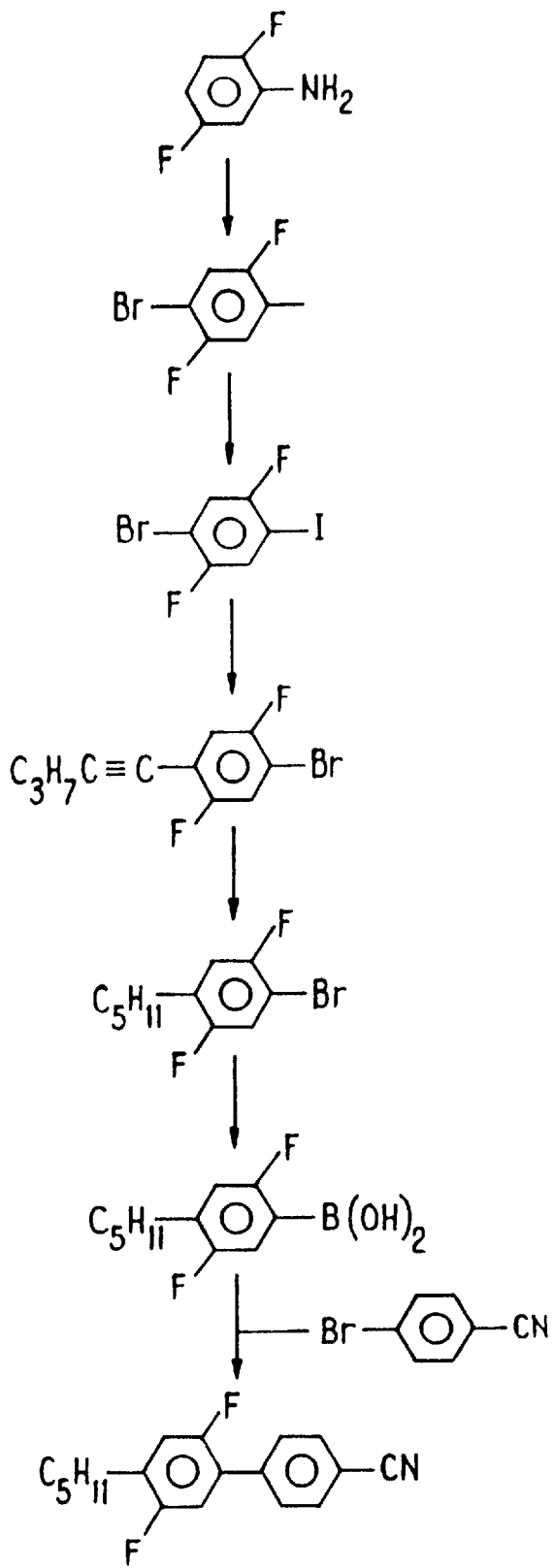

With reference to FIG. 5 it can be seen that example 5 can be prepared using the following synthetic route.

Step 5.1 4-Bromo-2,5-difluoroaniline.

N-Bromosuccinimide (28.50 g, 0.160 mol) is added in small quantities over 1.5 hours to a stirred, cooled (−10° to 0° C.) solution of 2,5-difluoroaniline (20.00 g, 0.155 mol) in dry dichloromethane under dry nitrogen. This mixture is stirred at 0° C. for 2 hours (glc analysis revealing a complete reaction), and the red solution then washed with a large amount of water (×2) and dried (MgSO$_4$). The solvent is removed in vacuo to afford a red solid with a yield of 32.19 g (100%).

Step 5.2 1-Bromo-2,5-difluoro-4-iodobenzene.

Quantities: compound 5.1 (19.00 g, 0.091 mol), sodium nitrite (7.22 g, 0.105 mol), potassium iodide (30.25 g, 0.182 mol).

This procedure is carried out as described for step 1.4 to yield 23.74 g (82%) solid.

Step 5.3 1-Bromo-2,5-difluoro-4-pent-1-ynylbenzene.

Quantities: pent-1-yne (4.90 g, 0.059 mol), n-butyllithium (7.20 ml, 10.0M in hexane, 0.072 mol), zinc chloride (9.80 g, 0.072 mol), compound 5.2 (20.0 g, 0.063 mol), tetrakis (triphenylphosphine)palladium(O) (1.10 g, 0.95 mol).

The experimental procedure is as described above for step 1.5 yielding 13.58 g (83%).

Step 5.4 1-Bromo-2,5-difluoro-4-pentylbenzene.

Quantities: compound 5.3 (12.60 g, 0.049 mol), platinum (IV) oxide (0.20 g), ethanol (150 ml).

This is an experimental procedure as described above in step 1.6, and yields 12.60 g (98%).

Step 5.5 2,5-Difluoro-4-pentylphenylboronic acid.

Quantities: compound 5.4 (11.90 g, 0.095 mol), n-butyllithium (4.50 ml, 10.0M in hexane, 0.045 mol), trimethyl borate (9.40 g, 0.090 mol).

This experimental procedure is a standard boronic acid preparation and yields a brown solid. The yield is 7.76 g (77%).

Step 5.6 4'-Cyano-2,5-difluoro-4-pentylbiphenyl.

Quantities: 4-Bromonitrobenzile (0.96 g, 5.27 mol), compound 5.5 (1.38 g, 6.05 mol), tetrakis(triphenylphosphine) palladium(O) (0.19 g, 0.16 mol).

This experimental procedure is as described above in step 2.3.

EXAMPLE 6

Preparation of:

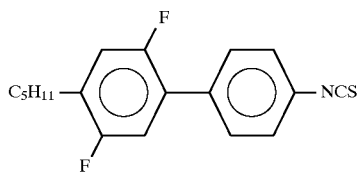

Figure 6:
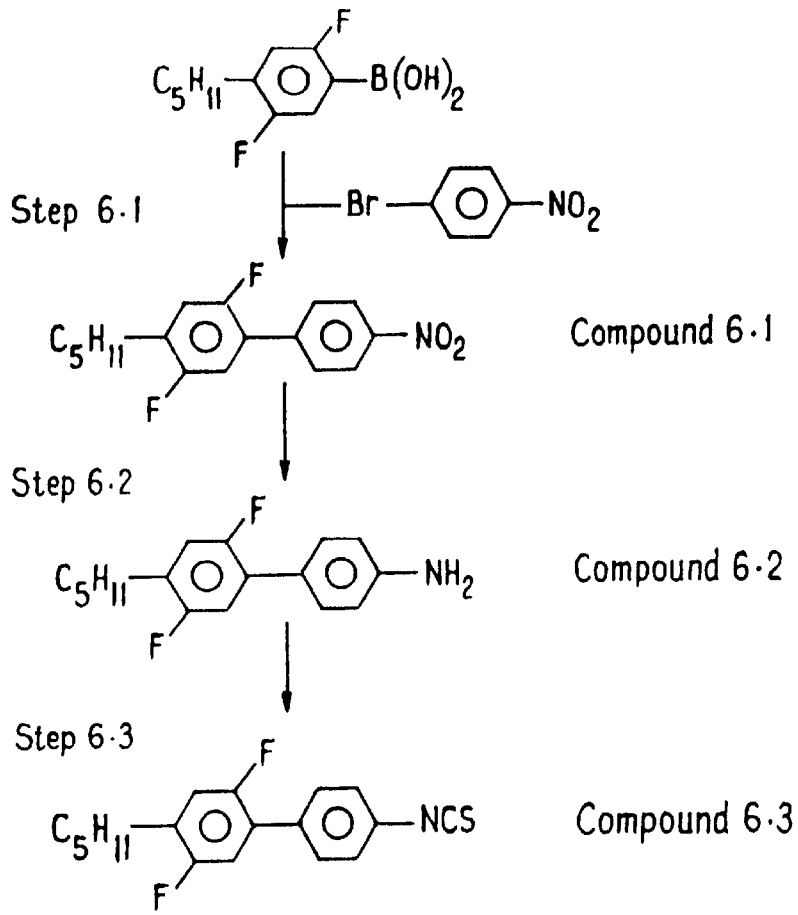

With reference to FIG. 6 it can be seen that example 6 can be prepared using the following synthetic route.

Preparation of the appropriate boronic acid is carried out in the procedures described above in steps 5.1 to 5.5.

Step 6.1 2,5-Difluoro-4'-nitro-4-pentylbiphenyl.

Quantities: 1-Bromo-4-nitrobenzene (1.25 g, 6.19 mol), compound 5.54 (1.55 g, 6.80 mol), tetrakis (triphenylphosphine)palladium(O) (0.22 g, 0.19 mol).

This experimental procedure is a standard nitration where the crude product is purified by column chromatography [silica gel/petroleum fraction (bp 40°–60° C.)—dichloromethane, 5:1] to give a pale yellow oil with yield of 1.88 g (100%).

Step 6.2 4'-Amino-2,5-difluoro-4-pentylbiphenyl.

Quantities: compound 6.1 (1.75 g, 5.74 mol), 5% Pd/C (1.30 g), ethanol (150 ml). This is a standard hydrogenation procedure as exemplified by step 1.9, yield is 1.57 g (99%).

Step 6.3 2,5-Difluoro-4'-isothiocyanato-4-biphenyl.

Quantities: compound 6.2 (1.47 g, 5.35 mol), thiophosgene (0.78 g, 6.78 mol), calcium carbonate (0.87 g, 8.70 mol).

This experimental procedure is as described in step 1.10 giving a yield of 0.80 g (47%) colourless crystals.

EXAMPLE 7

Preparation of:

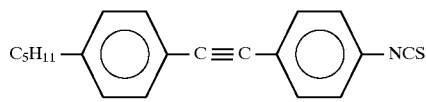

Figure 7:
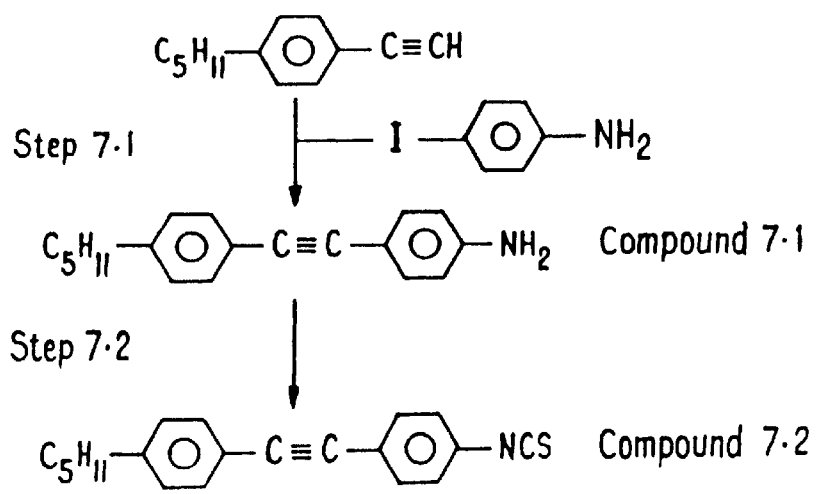

With reference to FIG. 7 it can be seen that example 7 can be prepared using the following synthetic route.

Step 7.1 1-(4-Aminophenyl)-2-(4-pentylphenyl)ethyne.

Quantities: 4-pentylphenylethyne (2.18 g, 0.0127 mol), n-butyllithium (5.10 ml, 2.5M in hexane, 0.0127 mol), zinc chloride (1.74 g, 0.0128 mol), 4-iodoaniline (2.5 g, 0.011 mol), tetrakis(triphenylphosphine)palladium(O) (0.38 g, 0.33 mol).

This experimental procedure is a zinc chloride coupling reaction as described above in step 1.5.

Step 7.2 1-(4-isothiocyanatophenyl)-2-(4-pentylphenyl) ethyne.

Quantities: compound 7.1 (2.38 g, 9.05 mol), thiophosgene (2.38 g, 9.08 mol), calcium carbonate (1.45 g, 0.015 mol).

This experimental procedure is as described in step 1.10 giving a yield of 2.23 g (81%) colourless crystals.

EXAMPLE 8

Preparation of:

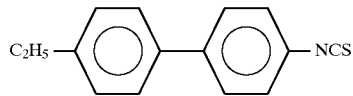

Figure 8:
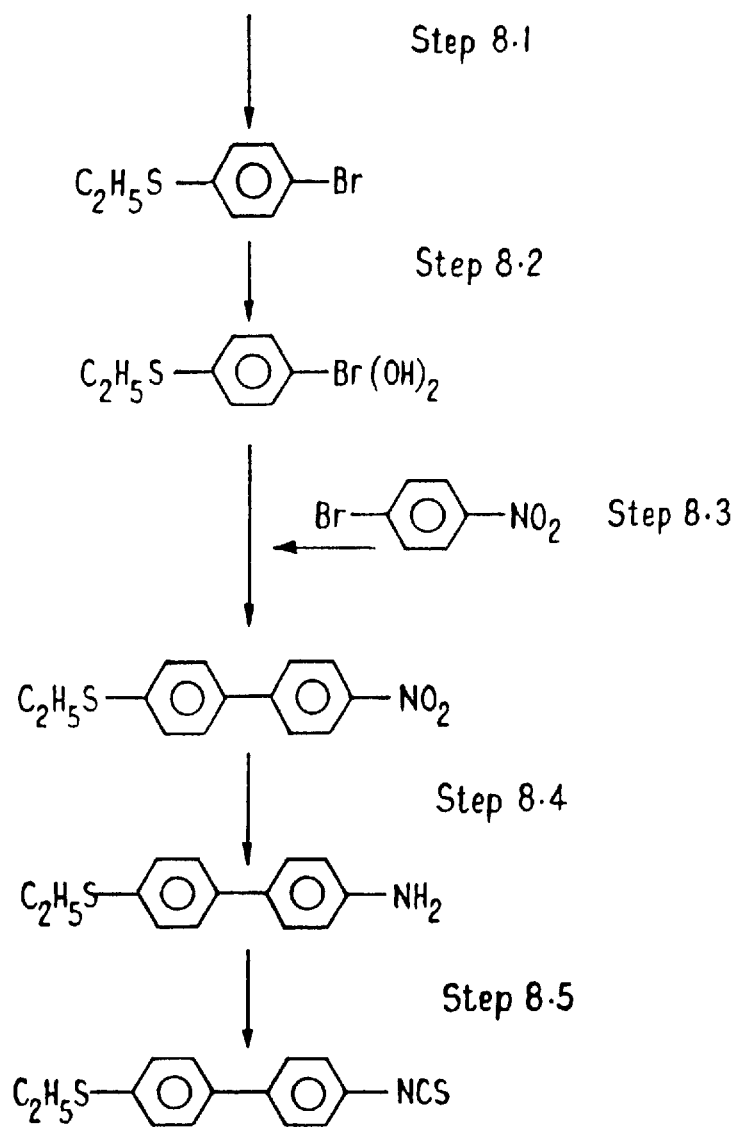

With reference to FIG. 8 it can be seen that

Step 8.1 1-Bromo-4-thioethylphenyl.

Bromoethane (70.15 g, 0.644 mol) was added to a stirred solution of 4-bromobenzenethiol (27.57 g, 0.146 mol) in sodium ethoxide (3.45 g of sodium metal in 100 ml of super-dry ethanol) at room temperature. The solution was heated at 80° C. for 2 h (glc analysis confirmed a complete reaction) and the sodium bromide was filtered off. The solvent was removed in vacuo and the residue was distilled to give a colourless liquid.

Yield 29.40 g (93%), bp 136°–137° C. at 20 mmHg.

Step 8.2 4-thioethylphenylboronic acid

Butyllithium (5.1 ml, 10.0M in hexane 0.051 mol) was added dropwise to a stirred, cooled (−78° C.) solution of step 8.1 (10.02 g, 0.046 mol) in dry THF (120 ml) under dry nitrogen at −78° C. The reaction mixture was maintained under these conditions for a further 0.5 h (glc analysis confirmed a complete reaction) before a previously cooled solution of trimethyl borate (10.40 g, 0.10 mol) in dry THF was added dropwise at −78° C. The reaction mixture was allowed to warm to room temperature (overnight) and stirred for 1 h with hydrochloric acid (100 ml, 10%) before the product was extracted into either (2×200 ml), washed with water and dried (MgSO$_4$). The solvent was removed in vacuo to afford a white solid which was used in the next step without purification.

Yield 17.29 g (95%), mp 88°–90° C.

Step 8.3 4-thioethyl-4'-nitrobiphenyl

1-Bromo-4-nitrobenzene (7.56 g, 00.37 mol) was added all at once to a rapidly stirred mixture of tetrakis (triphenylphosphine) palladium(O) (1.73 g, 0.001 mol), step 8.2 (7.81 g, 0.042 mol), and aqueous sodium carbonate solution (43 ml, 2.0M, 0.09 mol) in dimethoxyethane (50 ml), under dry nitrogen. The reaction mixture was refluxed overnight (tlc and glc analysis revealed a complete reaction) and the product was extracted into ether (2×200 ml); the combined ethereal solutions were washed with saturated sodium chloride solution (300 ml) and dried ($MgSO_4$). The solvent was removed in vacuo and the product was purified by column chromatography [silica gel/petroleum fraction (bp 40°–60° C.), dichloromethane, 5:1] and was recrystallised from ethanol to afford a pale yellow solid which was dried in vacuo ($P_2O_5$).

Yield 6.51 g (60%), mp 86.2°–86.4° C.

Step 8.4 4'Amino-4-thioethylbiphenyl

A stirred solution of step 8.3 (5.16 g, 0.020 mol) and palladium on carbon (5%, 1.96 g), in ethanol (30 ml) and tetrahydrofuran (30 ml), was stirred under hydrogen overnight. The catalyst was removed by filtration through 'Hyflo supercel' and the solvent was removed in vacuo to afford a purple solic which was used in the next step without purification.

Yield 4.61 g (100%).

Step 8.5 4-thioethyl-4'-isothiocyanatobiphenyl

A solution of step 8.4 (4.61 g, 0.020 mol) in chloroform (75 ml) was added to a stirred, cooled (0°–5° C.) solution of calcium carbonate (2.59 g, 0.026 mol) and thiophosgene (2.30 g, 0.020 mol) in water (40 ml) and chloroform (20 ml) at 0°–5° C. The mixture was heated at 35° C. for 1 h (glc and tlc analysis confirmed a complete reaction) and poured into water (50 ml). The organic layer was washed with hydrochloric acid (1%, 100 ml) and dried ($MgSO_4$). The compound was purified by column chromatography [silica gel/ petroleum (bp 40°–60° C.), dichloromethane, 5:1] and was recrystallised to give 0.57 g (22% yield) of a white solid which was dried in vacuo ($CaCO_3$), having an indicated (hplc) purity of >99%.

EXAMPLE 9

Preparation of

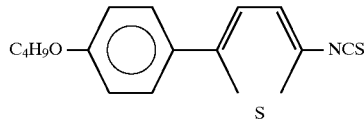

With reference to FIG. 9 it can be seen that

Step 9.1 2-Bromothiophene.

A solution of thiophene (31.88 g, 0.380 mol) and N-bromosuccinimide (64.00 g, 0.360 mol) in a mixture of chloroform (80 ml) and glacial acetic acid (80 ml) was heated under reflux (with stirring) for 0.5 hours (constant glc analysis revealed a complete reaction with minimal formation of 2,5-dibromothiophene). The reaction mixture was diluted with water and washed with dichloromethane (2×100 ml); the combined organic extracts were washed successively with water (300 ml) and aqueous potassium hydroxide (5%, 300 ml) before being dried ($MgSO_4$). The solvent was removed in vacuo and the residue was distilled to give a colourless liquid.

Yield 24.34 g (42%).

Step 9.2 2-Bromo-5-nitrothiophene.

Nitric acid (24.00 g, 1.42 sp gr, 0.381 mol) in acetic anhydride (50 ml) at 0° C. was added dropwise to a cooled (0° C.) rapidly stirred solution of the compound of step 5.1 (24.77 g, 0.152 mol) in acetic anhydride (50 ml). At the end of the addition the stirring was continued for 0.5 hr and the mixture was refrigerated overnight. The mixture was poured into ice water (400 ml) and the precipitate was filtered off, dissolved in ether (2×200 ml), and washed with water until free of acid. The solvent was removed in vacuo and the residue was purified by column chromatography [silica gel/petroleum fraction (bp 40°–60° C.), dichloromethane, 5:1] and was recrystallised from ethanol/dimethoxyethane, 100:1 to give a pale yellow solid which was dried in vacuo ($P_2O_5$) to give 66% yield of 20.89 g.

Step 9.3 2-(4-butoxyphenyl)5-nitrothiophene.

Quantities: 4-butoxy-1-phenylboronic acid (3.38 g, 0.017 mol), compound of compound of step 9.2 (3.31 g, 0.016 mol), tetrakis (triphenylphosphine) palladium(O) (0.910 g, 0.001 mol), sodium carbonate (15.8 ml, 2.0M, 0.03 mol).

The experimental procedure is carried out as described in step 8.3 above. The product was purified by column chromatography [silica gel/petroleum fraction (bp 40°–60° C.), dichloromethane, 3:1] and was recrystallised from ethanol to give 4.57 g (94% yield) of pale yellow solid which was dried in vacuo ($P_2O_5$).

Step 9.4 2-Amino-5-(4-butoxyphenyl)thiophene.

Quantities: compound of step 9.3 (2.98 g, 0.011 mol), palladium on carbon (5%, 1.97 g).

The experimental procedure is as described for the preparation of the compound of step 8.4 above, and gives a purple solid which can then be used in the next step without purification. Yield=2.72 g (100%).

Step 9.5 2-(4-butoxyphenyl)-5-isothionatothiophene.

Quantities: compound of step 9.4 (2.72 g, 0.011 mol), thiophosgene (2.07 g, 0.018 mol), calcium carbonate (2.20 g, 0.022 mol).

The experimental technique and procedure is as described for 8.5 above. The product is then purified by column chromatography [silica gel/petroleum fraction (bp 40–60), dichloromethane, 5:1] and was recrystallised from hexane to give a white solid which was dried in vacuo ($CaCO_3$). Yield=2.00 g (63%).

Liquid crystal transition temperatures between crystalline (K), nematic (N), smectic B ($S_B$) and isotropic (I) are given in Table 1 below for compounds of Formula I and Formula II. The table also contains a comparison of anisotropy in polarisability $\Delta a$ with that of 4-cyano-(4'pentyl)-1-phenylcyclohexane (5PCH) and the birefringence ($\Delta n$) of the compounds. [ ] denotes a virtual phase transition.

TABLE 1

| COMPOUND | PHASE TRANSITION TEMPS (°C.) | $\Delta a$ | $\Delta n$ |
|---|---|---|---|
| 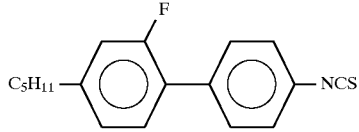 | K 95.8 [N 71.5] I | 2.86 | |

TABLE 1-continued
| COMPOUND | PHASE TRANSITION TEMPS (°C.) | Δa | Δn |
|---|---|---|---|
| 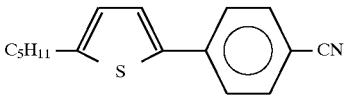 | K 39.5 [N 39.5] I | 2.11 | |
| 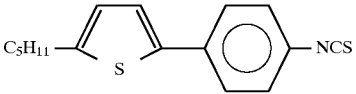 | K 72.5 [N 26.0] I | 3.61 | |
| 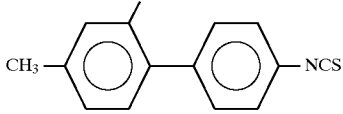 | K 64.5 [N −54] I | 2.42 | |
| 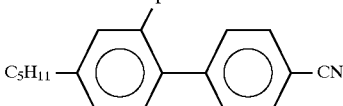 | K 54.5 [N −11] I | 1.82 | |
| 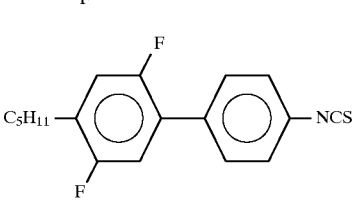 | K 51.5 [N −24] I | 2.8 | |
| 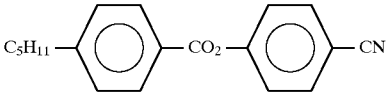 | K 60.3 [N 54.3] I | | |
| 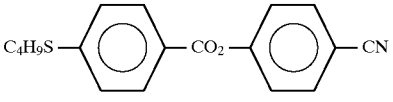 | K 82.2 [N 56.3] I | | |
| 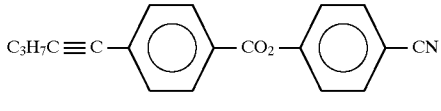 | K 87.1 [N 74.5] | | |
| 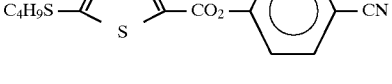 | K 58.3 I | | |
|  | K 81.2 S$_B$ 84.7 [N 26] I | 3.7 | 0.321 |
|  | K 74.8 S$_B$ 78.6 [N 44] I | 3.82 | 0.352 |
|  | K 77.5 S$_B$ 78.9 [N 43] I | | 0.396 |

TABLE 1-continued
| COMPOUND | PHASE TRANSITION TEMPS (°C.) | Δa | Δn |
|---|---|---|---|
| 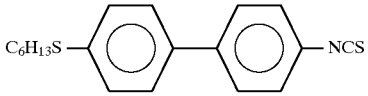 | K 76.2 S$_B$ 81.1 [N 49] I | | 0.331 |
| 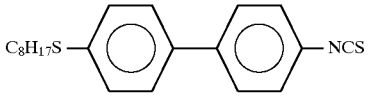 | K 75.7 S$_B$ 76.7 [N 45] I | | 0.309 |
| 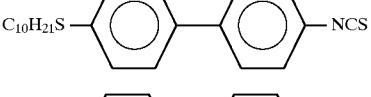 | K 68.0 S$_B$ 73.3 [N 47] I | | 0.309 |
|  | K 91.9 S$_B$ 92.4 [N 16] I | | 0.371 |
|  | K 74.5 S$_B$ 75.1 [N 19] I | | 0.344 |
|  | K 131.9 S$_B$ 135.4 [N 82] I | | 0.529 |
| 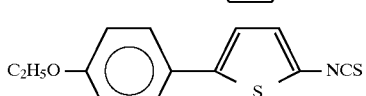 | K 78.5 S$_B$ 80.0 [N 34] I | | 0.331 |
| 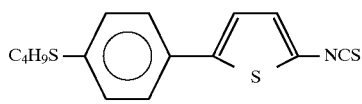 | K 91.9 S$_B$ 92.4 [N 10] I | | |
| 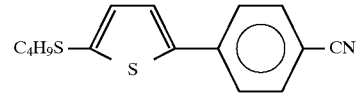 | K 74.5 S$_B$ 75.1 [N 19] I | | |
| 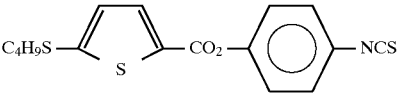 | K 32.6 [N −52] I | | |
| 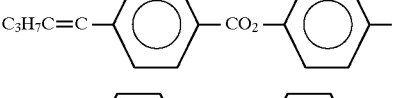 | | | 0.320 |
| 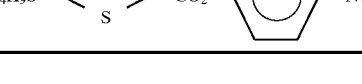 | | | 0.320 |
| 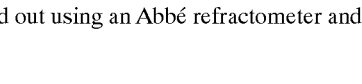 | | | 0.246 |
The Δn measurements are normalized for 25° C. and were carried out using an Abbé refractometer and using 3 wt % of the compound to be measured in a non-polar eutectic nematic host, typically such as

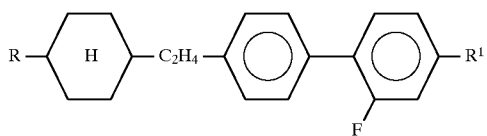

where R and R$^1$ are alkyl.

FIG. 10 a liquid crystal cell comprises a layer 1 of liquid crystal material, where the material is a mixture incorporating compounds of formula I, sandwiched between a glass slide 2 having a conducting layer 3 on its surface, eg of indium tin oxide, and a glass slide 4 having a transparent conducting layer 5 on its surface. The slides 2,4 bearing the layers 3,5 are respectively coated with films 6,7 of a polyimide layer. Prior to construction of the cell the films 6 and 7 are rubbed with a soft tissue in a given direction, the rubbing directions being arranged parallel to the construction of the cell. A spacer 8 eg of polymethylmethacrylate, separates the slides 2,4 to the required distance eg 5 microns. The liquid crystal material 1 is introduced between the slides 2,4 by filling the space between the slides 2,4 and spacer 8 and sealing the spacer 8 in a vacuum in a known way.

A polarizer 9 is arranged with its polarization axis parallel to the rubbing direction on the films 6,7 and an analyzer (crossed polariser) 10 is arranged with its polarization axis perpendicular to that rubbing direction. When a voltage is applied across the cell by making contact with the layers 3 and 5 the cell is switched.

In an alternative device (not shown) based on a cell construction as shown in FIG. 10 the layers 3 and 5 may be selectively etched in a known way, eg by photoetching or deposition through a mask, eg to provide one or more display symbols, eg letters, numerals, words or graphics and the like as conventionally seen on displays. The electrode portions thereby may be addressed in a variety of ways which include multiplexed operation.

FIG. 11 shows a Kerr cell 20. It comprises a glass cell 21 having two electrodes 22 and 23, which can be filled with a polar isotropic medium such as compounds of formula II or materials comprising mixtures including at least one compound of formula II. The cell 20 can be positioned between crossed linear polarisers 24 and 25, whose transmission axes are arranged to be at ±45° to an applied electric field. Where there is zero voltage across the electrodes 22 and 23, and the cell 20 acts as a closed shutter. The application of a modulating electric field from voltage source 26 generates an electric field causing the cell 20 to act as a variable wave plate and thus operating as a variable aperture shutter where opening is proportional to the electric field.

We claim:

1. A liquid crystalline compound represented by the formula

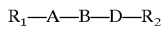

wherein

R$_1$ is hydrogen, C$_{1-20}$ alkyl, alkoxy, thioalkyl or alkynyl
B is a single bond, —C≡C—, —COO— or —OOC—;
R$_2$ is NCS and A and D are independently selected from the group consisting of phenyl, thiophene, mono-chlorinated phenyl, di-chlorinated phenyl, mono-fluorinated phenyl and di-fluorinated phenyl, provided one of A or D is thiophene.

2. A compound suitable for inclusion in a device utilizing pretransitional characteristics of liquid crystalline materials in the isotropic phase, the compound represented by the formula:

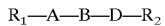

where

R$_1$ is hydrogen, C$_{1-20}$ alkyl, alkoxy, thioalkyl or alkynyl
B is a single bond, —C≡C—, —COO— or —OOC—;
R$_2$ is NCS;

and A and D are independently selected from the group consisting of phenyl, thiophene, mono-chlorinated phenyl, di-chlorinated phenyl, mono-fluorinated phenyl and di-fluorinated phenyl, provided one of A or D is thiophene.

3. A compound according to claim 1 wherein R$_1$ is C$_{1-15}$.

4. A compound according to claim 1 where B is a single bond.

5. A liquid crystal material, being a mixture of compounds, at least one of which is a compound as claimed in claim 1.

6. A liquid crystal device which uses a liquid crystal material according to claim 5.

7. A compound according to claim 2 wherein R$_1$ is C$_{1-15}$.

8. A liquid crystal material, being a mixture of compounds, at least one of which is a compound as claimed in claim 1.

9. A liquid crystal device which uses a liquid crystal material according to claim 8.

* * * * *